3,481,670
PHOTOGRAPHIC COPYING DEVICE
Kinya Amemiya and Koichi Endo, Tokyo, Japan, assignors to Konishiroku Photo Industries Co., Ltd., Tokyo, Japan, a corporation of Japan
Filed Oct. 26, 1966, Ser. No. 589,628
Int. Cl. G03b 27/70
U.S. Cl. 355—66                                    7 Claims

ABSTRACT OF THE DISCLOSURE

A photographic copying device comprises a movable illuminating means to illuminate the surface of a stationary and planar original, a movable light-sensitive surface, a stationary light shield positioned adjacent to the light-sensitive surface and having a slit, and an optical system arranged between both surfaces. The optical system includes a pair of mirrors arranged inclined to the surface of the original and a lens interposed between the pair of mirrors for focusing an image of the original through the slit onto the light-sensitive surface. The optical system is movable in a direction parallel to the surface of the original. The movable illuminating means, the optical system, and the light-sensitive surface are moved with their respective predetermined speeds.

---

The invention relates to a photographic copying device, and more particularly to an image projector for such copying device by which an image of a stationary original is projected onto a moving light-sensitive surface in such a manner that the image is focused on the surface in stationary relationship with respect to the light-sensitive surface.

Devices are known which project an image of an original to a moving light-sensitive surface in stationary relationship with respect to the surface. In one known projector, for example, a stationary original is scanned, that is, illuminated through a movable slit and its image is focused on a light-sensitive surface through a lens which is adapted to move in timed relationship with the slit. It is also known to reduce the dimension of such projector by providing a pair of stationary mirrors arranged askew and on both sides of the lens, and moving the latter, in the space defined by the mirrors, perpendicularly to the optical axis of the lens.

Such projectors have disadvantages as mentioned below. First, because of intermingled arrangement of stationary parts and moving parts, that is, the lens being displaced in the path of light from the original to the light-sensitive surface within a space limited by the mirrors held stationary, the whole optical system must have a correspondingly large space to afford a sufficient clearance for the movement of the lens. In particular, the pair of mirrors are required to have a large area of reflection to cover the entire region of light path which is displaced as the lens moves.

Secondly, in a known photographic copying device, a pair of rails are provided along the path of movement of the lens to guide the latter by engagement of the opposite edges of the lens with longitudinal grooves in the rails. An extremely high precision is required in machining the grooves and fixtures that hold the lens edge in the groove in order to ensure the accuracy of the movement of the lens. In particular, the lens should not be subject to vibration, since the mass of inertia of the lens is not great enough to absorb it and therefore its motion is liable to be influenced thereby.

Therefore, it is the object of the invention to eliminate the above mentioned disadvantages of known devices and to provide a novel and improved copying device.

It is another object of the inention to provide a copying device of smaller size than ever known.

It is further an object of the invention to provide a projecting apparatus adapted for use in a copying device of simple construction.

According to the invention, an original to be copied is placed stationary and a light source for illuminating the original is mounted adjacent thereto for movement with a constant speed. A light-sensitive surface is arranged opposite the original and is also adapted to move with a constant speed. An image is projected on the surface through an optical system and a stationary slit, the latter being positioned adjacent the light-sensitive surface. The optical system comprises a pair of mirrors having reflecting faces which are inclined with respect to the surface of the original, and a lens interposed between the reflecting mirrors, the lens being arranged to be rigid with the mirrors. In use, the optical system is moved in a direction parallel to the surface of the original with a definite speed interrelated with that of the light-sensitive surface.

In accordance with the invention, the pair of mirrors are moved integrally with the lens, so that the mirrors need not to provide a large area of reflection which would otherwise be required to cover the wide range of displacement of light path caused by the independent movement of the lens. The necessary reflection area for the mirrors is substantially decreased in the projector of the invention and is determined by the range of varying angle of light path through the lens when the original is scanned by the moving light source. In this way the projector is considerably reduced in size. Further reduction of size can be achieved according to the invention by decreasing the distance between the lens and the mirrors.

It is one feature of the invention that the lens moves parallel to the surface of the original.

Because a substantial part of the light path runs parallel to the surface of the original, the space occupied by the optical system, that is the space between the surface of the original and the light-sensitive surface can be greatly reduced. Furthermore, the optical system is constructed as an elongated unit which is moved in its longitudinal direction so that its movement is stabilized.

These and other objects, features and advantages of the invention will become evident from the following description thereof with reference to the drawing, wherein:

FIGS. 1(a) to (c) are schematic views for illustrating the principle of the invention;

In the drawing, like parts are designated by same reference numerals.

Figure 1A:
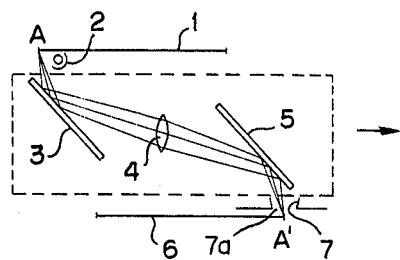
Figure 1B:
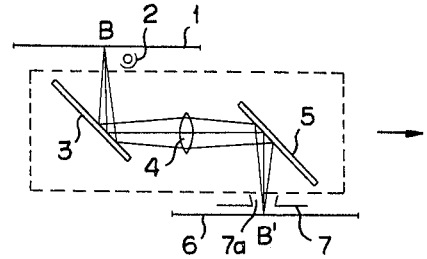
Figure 1C:
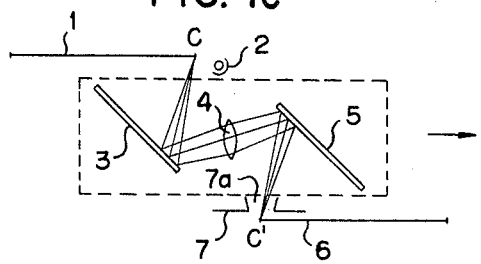

Referring to FIGS. 1(a) to (c), which schematically show the projector of the invention, an original 1 is held stationary on a suitable support. A light source 2 illuminates the surface of the original and is adapted to move, from left to right, parallel to the surface of the original with a constant speed, thereby scanning the original. Ray reflected from the surface of the original impinges on a first reflecting mirror 3, reflected therefrom and passes through a lens 4 to be reflected again by another mirror 5 forming the counterpart of the pair. Then the ray is projected to a light-sensitive paper 6 through a light shield 7 having a slit 7a to focus an image of a part of the original on the paper 6. The optical system comprising the pair of mirrors 3, 5 and the lens 4 is constructed as an integral unit and is so moved that the direction of movement of the lens is parallel to the surface of the original. In FIG. 1, the optical system is indicated by broken lines encircling the elements 3, 4 and 5.

The image to be focused on the light-sensitive paper will shift with a constant speed when the light source 2 and the optical system begin to move with their respective, predetermined speed. In order to avoid "flow" of the image produced on the paper 6, the latter is moved in synchronism with the rate of "flow" of the image so that a stationary image may be projected on the paper 6. In the example shown in FIGS. 1(a) to (c), an image will be projected on an equal scale with the original, i.e., magnification is 1. The lens 4 is positioned at the center of the path of projecting ray between the surface of the original 1 and the light-sensitive paper 6. The speed proportions in this case are such that the light source 2 illuminating the surface of the original will move in the same direction and with the same speed as the light-sensitive paper, while the optical system moves in the same direction, but with a speed half as large as that of the light-sensitive paper. In FIG. 1(a), the left-most part A of the original is projected on the right-most part A' of the paper 6, the ray passing through the lens 4 with an inclination with respect to the horizontal which is substantially smaller than 90°. In FIG. 1(b), the central part B of the original is projected on the central part B' of the paper, the light path passing through the lens substantially horizontally. In FIG. 1(c), the right-most part C of the original is projected onto the left-most part C' of the paper 6.

While the projector has been illustrated and described herein as having the magnification of 1:1, it should be apparent to those skilled in the art that any desired magnification, e.g., magnification of 1:½, 1:2 etc., can be achieved in the projector by proper choice of the speed proportions among the light source, optical system and the light-sensitive paper.

Figure 2:
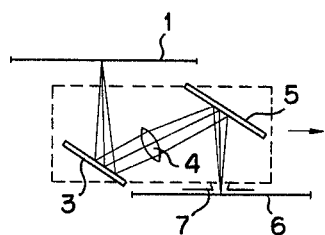
FIGS. 2 and 3 are schematic views of several embodiments of the projector according to the invention.

FIG. 2 shows another embodiment of the projector which is preferred when a projector of less height is desired. In this embodiment, when the optical system has advanced to a position as shown where it projects the central part of the original to the central part of the light-sensitive paper, the ray passing through the lens 4 is inclined with respect to the horizontal. Therefore, it will be seen from comparison with FIG. 1(b) that the projector has a height which is decreased by an amount which is equal to the sine of the angle of inclination multiplied by the length of the ray path defined between the pair of mirrors.

Figure 3:
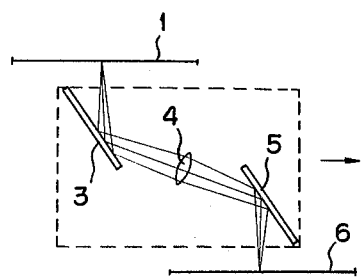

Similarly, FIG. 3 shows another embodiment wherein the width of the projector is reduced. As will be seen from FIG. 3, the distance between the mirrors 3 and 5 is shortened by an amount which is equal to the cosine of the angle of inclination, which the ray forms with respect to the horizontal when the central part of the original is projected to the central part of the paper 6, multiplied by the path length between the mirrors followed by the ray at such time.

Such reduction in height or width of the projector is achieved by arranging the lens so that its optical axis forms a suitable inclination with respect to the horizontal or the surface of the original.

Figure 4:
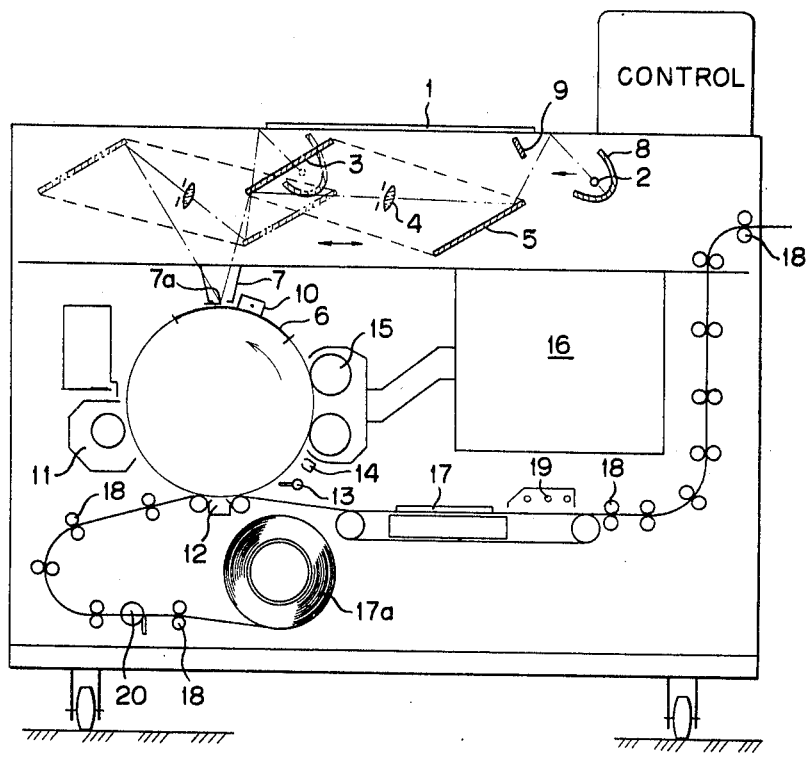
FIG. 4 is a schematic view of an electrophotographic copying device according to one embodiment of the invention.

FIG. 4 illustrates schematically an embodiment of an electrophotographic copying machine according to the invention. The machine includes the light source 2 and the optical system 3, 4, 5 as before and a reflecting mirror 8 is provided behind the light source to direct light emitted therefrom onto the surface of the original 1 uniformly. To ensure uniform illumination of the original, an auxiliary reflection mirror 9 is provided in the optical system adjacent the original and moves together with the light source.

In the embodiment shown, the light-sensitive paper 6 is loaded on a drum which, in use, is rotated by a suitable driving unit. Above the drum is positioned the light shield 7 having the slit 7a so that an image of the original may be continuously projected on the paper 6 as it passes under the slit 7a while the light source 2 scans the surface of the original as indicated by a single-ended arrow. Concurrently with the scanning, the optical system moves in the same direction as the light source in a manner mentioned herein-above and returns to its original position after the whole area of the original has been projected, such motion of the optical system being indicated in the drawing by a double-ended arrow.

As for the copying process proper, the machine includes a charging unit 10, a developing unit 11, an image-transferring unit 12, a transfer paper detaching unit 13, a cleaning electrode 14 for neutralizing residual charges on the light-sensitive surface or paper 6 after the image transfer has been finished, and a cleaner 15. These units are arranged in sequence around the periphery of the drum. The block designated by reference numerals 16 indicates a container for receiving any residual developing powders as freed from the paper 6 by the cleaner 15.

In operation, the drum is rotated counterclockwise with a constant speed as indicated by an arrow and the light-sensitive paper 6 loaded on the drum is initially provided with a uniform distribution of electrostatic charge by the unit 10. When the paper is subjected to light reflected from the original 1 through the slit 7a, an electrostatic latent image is formed on the paper 6 in correspondence to the pattern on the original. The latent image is developed at the unit 11 with electro-scopic powders which may be any kind of toners well known in the art. When the drum is further rotated, the paper 6 is brought into close contact with a sheet of transfer paper 17 at the transfer unit 12, whereby the powder image on the paper 6 is transferred upon the transfer paper. The latter is supplied from a roll 17a through a cutter 20 and feed rollers 18. It will be self-evident that the supply of the transfer paper to the unit 12 should be effected in timed relationship with the movement of the light sensitive paper 6. The transfer paper having an image transferred from the paper 6 is removed therefrom by the unit 13, guided sideway to pass through a fixing unit 19 to have the image fixed and then fed over rollers 18 to a suitable receptacle. On the other hand, after the transferring process, the light-sensitive paper 6 passes under the cleaning electrode 14 where any residual charge on the paper 6 will be neutralized, and subsequently any residual developing powder will be wiped off by the cleaner 15 and fed to the container 16. Thus the light-sensitive paper 6 is ready for another exposure to the imagewise radiation at the slit 7a.

While the copying machine has been described with the light-sensitive paper 6 loaded on the drum serving as the light-sensitive surface, the paper 6 may be omitted by replacing the drum by a selenium plate known in the art of xerography.

Figure 5:
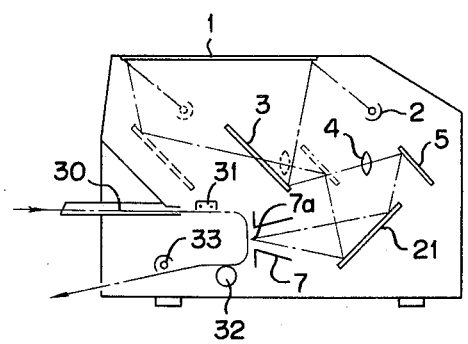
FIG. 5 is a schematic view of an electrostatic copying machine according to another embodiment of the invention.

FIG. 5 shows another embodiment of the invention where the projector is used in an electrostatic copying machine. Since in this instance an image projected on a light-sensitive paper is to be fixed without involving a transfer process, a correct image must be projected on the light-sensitive paper in contrast to the xerographic process. As an image erecting device, a reflecting mirror 21 is fixedly arranged adjacent the second mirror 5 of the optical system. A light-sensitive paper is loaded in the machine at an inlet opening 30, uniformly charged at a charging unit 31, subjected to imagewise exposure, through the slit 7a, to the light from the original, developed at 32 and fixed at 33 to be delivered outside the machine.

What is claimed is:
1. Photographic copying device comprising movable illuminating means to illuminate the surface of a sta- tionary and planar original, a movable light-sensitive surface, a stationary light shield positioned adjacent to said light-sensitive surface and having a slit, and an optical system arranged between both said surfaces and including a pair of mirrors arranged inclined to the surface of said original and a lens interposed between said pair of mirrors for focusing an image of said original through said slit onto said light-sensitive surface, said optical system being movable in a direction parallel to the surface of said original, said movable illuminating means, said optical system and said light-sensitive surface being moved with their respective predetermined speeds.

2. A photographic copying device according to claim 1, wherein the optical axis of the lens is substantially parallel to the stationary surface.

3. A photographic copying device according to claim 1, wherein the optical axis of the lens is inclined with respect to the stationary surface.

4. A photographic copying device according to claim 1, wherein an image erecting device is interposed in the light path between the optical system and the slit.

5. A photographic copying device according to claim 1 wherein the movable, light-sensitive surface is arranged opposite the planar original.

6. A photographic copying device according to claim 1 wherein said illuminating means is disposed between said stationary and planar original and said movable light-sensitive surface.

7. A photographic copying device according to claim 1 wherein said optical system is movable through a distance less than the length of said stationary and planar original.

References Cited
UNITED STATES PATENTS

| | | | |
|---|---|---|---|
| 2,176,910 | 10/1939 | Levy | 88—24 |
| 2,940,358 | 6/1960 | Rosenthal | 88—24 |
| 3,323,412 | 6/1967 | Tchejeyan | 88—24 |

NORTON ANSHER, Primary Examiner

W. A. SIVERTSON, Assistant Examiner